March 1, 1966 — M. J. BOCK — 3,238,529
MULTI-POLARIZATION RECEIVING SYSTEM
Filed Feb. 6, 1963 — 2 Sheets-Sheet 1
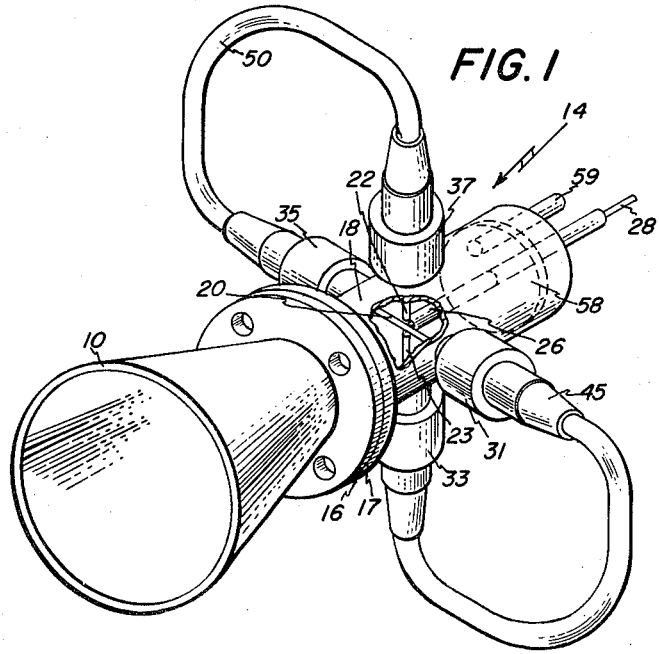
INVENTOR
MARVIN J. BOCK
BY Herbert W. Arnold
ATTORNEY March 1, 1966   M. J. BOCK   3,238,529
MULTI-POLARIZATION RECEIVING SYSTEM
Filed Feb. 6, 1963   2 Sheets-Sheet 2
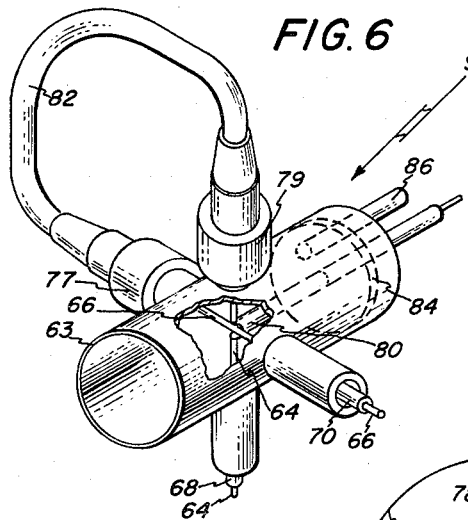
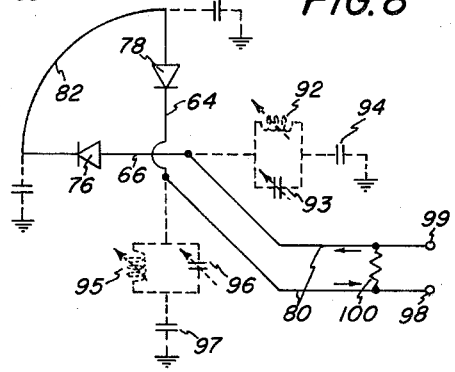
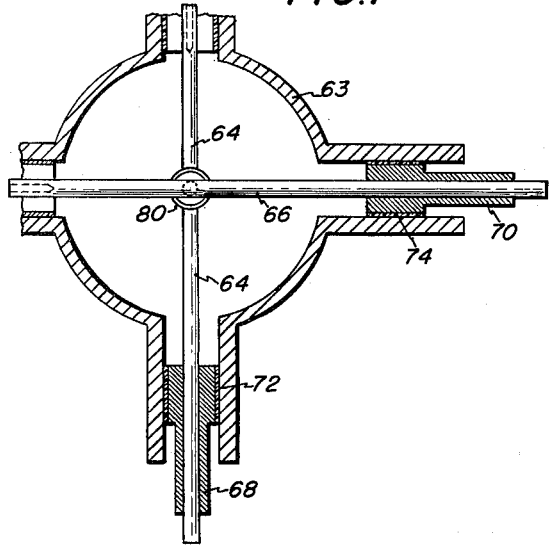
INVENTOR
MARVIN J. BOCK
BY Herbert W. Arnold
ATTORNEY

United States Patent Office 3,238,529
Patented Mar. 1, 1966

3,238,529
MULTI-POLARIZATION RECEIVING SYSTEM
Marvin J. Bock, Santa Barbara, Calif., assignor to Raytheon Company, Lexington, Mass., a corporation of Delaware
Filed Feb. 6, 1963, Ser. No. 256,671
15 Claims. (Cl. 343—100)

This invention relates to electromagnetic energy receiving systems and more particularly to systems for receiving a plurality of polarizations of electromagnetic energy signals substantially independently of the orientation of any of said polarizations.

In the past, systems for receiving electromagnetic energy signals having a plurality of linear polarizations have used unidirectional current devices, such as diodes, as pick ups or intercepting devices for polarized energy and are usually positioned in the path of said energy. Energy is directed to such devices through a plurality of polarization selective transmission lines such as rectangular, square, round, ridged or elliptical guided wave structures, and it is usually required that the energy intercepting structure be oriented to intercept a maximum amount of energy. However, whenever the energy intercepting structure becomes misaligned with respect to incident polarization of energy being directed thereto, a reduction in the output of a detected signal occurs due to the reduction of energy transfer from the source of polarized energy to the intercept probe or detecting device. For example, in a circular waveguide, propagating energy in the $TE_{11}$ mode, the electric vector orientation of the energy may be at an angle other than parallel to the probe or intercepting structure. In such instances, power detected by the diode becomes reduced by the angular displacement from the parallel orientation of the E vector. Little or no energy is intercepted or received by the diode intercepting structure or probe when the vector orientation of the polarized energy is displaced by substantially 90° with respect to the longitudinal axis of the probe. For the case of either left or right hand circular polarization propagating through a round or symmetrical guided wave structure, only one half of the circular polarized power is received by the diode for any given orientation. Additionally, such orientation becomes extremely difficult or impossible to maintain when it is required that the detection device have a capability of simultaneously detecting all radiation polarizations. Instances, for example, in which it is desired to receive all polarizations simultaneously are, for example, reception of multi-polarized transmissions, guidance and communications in the presence of unstabilized roll conditions of the transmitting or receiving vehicle, or reception of energy which has become depolarized due to the particular medium by which the energy is propagated or reflected. Also, in the art of microwave plasma interaction and spectroscopy investigations, simultaneous detection of energy which has become depolarized into plurality of polarizations become important. In such cases, when the polarization detecting system is incapable of detecting all polarizations simultaneously, depolarized energy components are either not accepted or lost to the detection process.

It is, therefore, an object of the invention to provide an improved receiving system for electromagnetic wave energy having a plurality of polarizations.

In accordance with the invention, a receiving system which is substantially insensitive to the orientation of the electrical components of electromagnetic wave energy having a plurality of polarizations is achieved by rectifying orthogonal components of said energy and combining the rectified components to provide an output signal. For rectification of said orthogonal components a unidirectional current device is used to provide a rectified output for each component and the unidirectional current devices are connected so that the rectified components are combined to provide an output signal. In this manner, an output signal is provided which is substantially independent of the orientation of the polarization of the input electromagnetic wave.

These and other objects of the invention will become apparent upon consideration of the following description in conjunction with the accompanying drawings wherein:

FIG. 1 is a perspective drawing partly in section of one embodiment of the invention;

FIG. 2 is a sectional view showing in detail the embodiment of the invention shown in FIG. 1;

FIG. 3 is a schematic diagram of the multi-polarization receiving system;

FIGS. 4 and 5 are sectional views showing in detail the arrangement of converting energy intercepting probe structure to an output circuit;

FIG. 6 is a perspective view partly in section of another embodiment of the invention;

FIG. 7 is a sectional view showing in detail the shorting bar arrangement of FIG. 6; and FIG. 8 is a schematic diagram of the multi-polarization receiving system of FIG. 6.

Referring now to FIGS. 1, 2, and 3, there is shown an antenna 10 which receives electromagnetic energy waves having a plurality of polarizations and is provided with an output flange 16 for connecting to a polarization receiving device 14 by means of receiving device flange 17. The polarized electromagnetic wave energy is introduced into circular waveguide structure 18. As energy intercept structure or probe 20 extends across the axis of the circular waveguide and in a plane perpendicular to said axis. A second intercept structure or probe 22 and its extension 23 extends orthogonally to probe 20 across the waveguide in the same plane. FIGS. 4 and 5 show in detail that probe 20 is electrically isolated from probe 22 and its extension 23. Outer conductor 24 of a coaxial output line 26 is recessed or cut away so as not to contact probe 20 and connects the companion section 23 to probe 22. Coaxial line 26 is, for example, a 50 ohm line, the inner conductor 28 of which is integrally connected to the mid-point of probe 20 and is insulated by means of a Teflon dielectric supporting structure 27. The orthogonal probes 20 and 22 and its companion section 23 intercept electromagnetic energy of any polarization in guided wave structure 18 and there is induced on said probes components of such polarized energy. The probes extend through associated apertures in the waveguide 18, as shown in FIG. 2, and are connected to the inner conductor 30 of unidirectional current devices such as, for example, coaxial crystal diodes 32, 34, 36, and 38 supported in diode mounts 31, 33, 35, and 37 respectively. For example, FIG. 2 shows in detail a well known screw mounting assembly 31 for diode 32. These diodes may be, for example, types 1N358 or 1N1132. For example, diode 32 is shown in FIG. 2 having an insulated output terminal or cap 40 which is connected to the inner lead 42 of flexible coaxial connecting cable 44 secured thereto by a concentric fastener 45. Diode output terminal 40 is insulated from its outer shell 46, and provides a capacitance to ground represented by capacitor 48 in FIGS. 2 and 3. This capacitance provides the electromagnetic energy bypass to ground for the diode 32. The capacity to ground for the 1N358 diodes is approximately 7 micro-micro-farads. The remaining diodes 34, 36, and 38 are mounted in a manner similar to diode 32 and also have similar bypass capacitances. It should be noted that for convenience in mounting diodes 34 and 38 are conventional reverse diodes of the same type or forward diodes 32 and 36.

Referring to FIG. 3 diodes 32 and 34 are connected in series by flexible shielded cable 44 and diodes 36 and 38 connected in series by shielded cable 50. The unidirectional current devices or diodes on each probe are poled back-to-back. However, diodes 32 and 34 are connected in series and poled in the same direction with respect to output terminals 60 and 62. Diode devices 36 and 38 are also connected in series and poled in the same direction with respect to output terminals 60 and 62. This circuit arrangement, which will be described in detail, provides in a novel manner full-wave rectification of multi-polarized electromagnetic energy intercepted by probes 20 and 22 along with its companion probe 23 and rectified electromagnetic energy appears across load 56 of FIG. 3 substantially independently of the orientation of the electric vector of the said polarized energy with respect to said probes. Thus, a circular polarized or randon polarized wave, of for example, 10 kilomegacycles provides an output voltage across load 56 independently of the orientation of the receiving device 14 with respect to the plane wave front of such energy entering circular waveguide 18 from antenna structure 10. With this arrangement, receiving device 14 can be mounted on a vehicle or structure which is not spin or roll stabilized with respect to linear polarized energy and can receive substantially all the energy contained in a signal having a plurality of polarizations, including both right and left hand circular polarizations, without a change in receiving structure or orientation thereof. Such polarizations include arbitrary linear and arbitrary elliptical polarizations. The unidirectional current devices in each probe rectify the horizontal and vertical components to the arbitrary linear polarization and combine the rectified output signals from devices 32, 34, 36 and 38 in a manner in which the outputs are summed to provide a full wave rectified output signal. As previously noted, diode devices 32 and 36 along the common probe 20 are reverse type diodes of, for example the 1N358R class, and diodes 34 and 38 along the common probes 22 and extension 23 are forward diodes.

To provide that a maximum amount of arbitrarily polarized electromagnetic wave energy is intercepted by probes 20 and 22, and extension 23, a conventional R.F. shorting plunger 58 shown in FIG. 1, is slidably positioned on the opposite side of the input to the circular waveguide 18 and is provided with an adjusting arm 59. It is adjusted to a position to match impedances of receiving device 14 to the incoming signal. Preferably, it is adjusted to approximately one quarter guide wavelength, at the operating frequency, from the plane of the intercepting probes. Also, intercepting diodes 32 and 36 are preferably spaced at an odd number of half-wave lengths apart along probe 20 and diodes 34 and 38 are similarly spaced along probe 22 and extension 23.

In describing the operation of the device, consider the arrow representation of the diodes in FIG. 3 designates the rectification and conduction for a positive cycle of energy as well as permitting conduction of direct current. For purposes of explanation, and referring to FIG. 3, assume that a vertically polarized wave with respect to probe 22 and its extension 23 has an instantaneous peak R.F. cycle whose positive vector is in a direction in which rectification and current flow occurs in diode 34, but not in diode 38. Thus, current flows in the direction of output terminal 60, as indicated by arrows in FIG. 3. This current flow completes a path through diode 32 and shielded connecting cable 44 from output terminal 62. No path for current is at this instant completed through reverse diode 36. Now, on the alternate R.F. half cycle, assume that the vertically polarized wave with respect to probe 22 and extension 23 has an instantaneous peak R.F. cycle whose negative vector is in a direction in which the rectification and current flow occurs in diode 38, but not in diode 34. Thus, current flows in the direction of output termnial 60. This current flow completed a path through diode 36, and shielded connecting cable 50 from output terminal 62. No path for current is at this instant completed through reverse diode 32. Thus, full wave rectification of both positive and negative peaks of the vertically polarized energy is achieved.

Rectification of a horizontally polarized wave will now be described. Assume that a horizontally polarized wave with respect to probe 20 has an instantaneous peak R.F. cycle whose positive vector is in a direction in which rectification and current flow occurs in diode 32, but not in diode 36. Thus, current flows from output terminal 62 through diode 32, through shielded connecting cable 44, diode 34, and then to terminal 60. Current does not pass through diode 38 at this time. Now on the alternate R.F. half cycle, assume that the horizontally polarized wave with respect to probe 20 has an instantaneous peak R.F. cycle whose negative vector is in a direction in which the rectification and current flow occurs in diode 36, but not in diode 32. Thus, current flows from output terminal 62 through diode 36, through shielded connecting cable 50, diode 38 and then to terminal 60. Current does not pass through diode 34 at this time. Thus, there is provided an electrically symmetrical quadrature structure. Since, then, any arbitrarily linearly polarized wave can be reduced to its vertical and horizontal orthogonal components, the magnitudes of these R.F. signals after rectifications are combined by such symmetrical quadrature structure to produce an output signal in load 56 having substantially the same magnitude for either a horizontally or vertically polarized signal or a signal having a random orientation. For example, a 45° polarized wave provides instantaneous vertical and horizontal components which are combined to produce an output signal in load 56 of substantially the same magnitude as in the case of either a vertically or horizontally polarized signal. In this manner, receiver 14 is capable of receiving at the R.F. rate or transmission frequency arbitrarily oriented linearly polarized energy.

The following description is now given with respect to the reception of right and left hand circular polarized electromagnetic wave energy. Circular polarization can be defined as the resultant of two mutually perpendicular component waves having equal amplitude and displaced relative to each along the axis of propagation by 90° or a quarter wavelength at the operating frequency. Circular polarization can also be considered as the resultant linear vector rotating along the axis of propagation at the R.F. rate. Since receiver device 14 is substantially R.F. phase insensitive, due to the location of both probes in the same plane perpendicular to the input wave front, and since rectification of polarized energy is at the R.F. rate, the magnitudes of the components of the two mutually perpendicular circularly polarized waves are combined to produce an output signal in load 56 of substantially the same magnitude as in the case of either a horizontal or vertically polarized signal. That is to say that the resultant linear vector of polarized energy which is rotating along the transmission axis at the R.F. rate is rectified and combined to provide a signal of similar magnitude in load 56.

In the case of elliptically polarized electromagnetic waves which are regarded as the superposition of two linearly polarized waves of arbitrary amplitudes which are in both time and space quadrature, polarized waves have instantaneous horizontal and vertical components, and thus rectification and combining of such components is likewise achieved. In this manner, the receiving device 14 operates substantially independently of polarization orientation of input electromagnetic energy having a plurality of polarizations which may be randomly or arbitrarily oriented in time and space.

Referring now to FIGS. 6, 7, and 8 there is shown a further embodiment of a multi-polarization receiving system 90 in which half-wave rather than full-wave rectification of electromagnetic wave energy having a plurality of polarizations is achieved. In this embodiment, a receiving system is shown, parts of which are similar to that of FIGS. 1, 2, and 3 except that unidirectional current device or diode 32, which is a conventional reverse diode, and unidirectional current device or diode 34, are each replaced by insulated R.F. shorting bars or matching plungers 68 and 70. These shorting bars are, preferably, of approximately the same diameter as the diameter of the diodes 32 and 34. Referring more particularly to FIG. 6, electromagnetic wave energy having a plurality of polarizations enters circular waveguide structure 63 which is capable of propagating electromagnetic wave energy having a plurality of polarizations when positioned in the path of said energy in a manner to intercept the plane wave front of said energy. Energy intercept probes 64 and 66 are provided, and have a length sufficient to extend through associated apertures in the cylindrical waveguide 63 and an axial aperture in shorting bars 68 and 70, respectively.

As shown, in FIG. 7, this arrangement provides a moveable R.F. shorting device in order to match the R.F. impedance of waveguide 63 to each of the two unidirectional current devices, such as diodes 76 and 78. It should be understood that probes 64 and 66 are the energy intercepting probes and are R.F. terminated by the shorting plungers 68 and 70. The outer diameter of each plunger is insulated with Teflon rings 72 and 74 which provides an R.F. bypass for the energy intercepting probes and functions in a known manner as a tuning stub for each probe. The insulated matching plungers 68 and 70 prevent shorting of the rectified signal output which is extracted from the probes by a coaxial output line 80 of FIG. 6. Coaxial output line 80 is connected to the probes in the same manner as output line 26, as shown in FIGS. 1, 4, and 5. Also diodes 76 and 78 of FIG. 8 are of the same type as diodes 36 and 38, respectively of FIGS. 1 and 3 and are connected in the same manner as shown in FIG. 2. Diodes 76 and 78 are connected in series by flexible shielded connecting cable 82 shown in FIG. 6 and supported by well known diode mounting assemblies 77 and 79 similar to diode mounts 35 and 37 of FIG. 1. In order to provide that probes 64 and 66 intercept or pickup an optimum amount of arbitrarily polarized electromagnetic wave energy, a conventional shorting plunger 84 having an adjusting arm 86 is slidably positioned in circular waveguide 63, as shown in FIG. 6. Plunger 84 is adjusted to approximately one-quarter guide wavelength beyond the probes prior to optimizing the probe line lengths by shorting bars 68 and 70 of FIG. 7.

The schematic diagram of FIG. 8 shows the equivalent electrical circuit for the half-wave multi-polarization receiving system 90 of FIG. 6. The equivalent circuit for slidable shorting bar 70 of FIG. 7 is shown in FIG. 8 as a variable inductance 92 in parallel with a variable capacitance 93 connected to probe 66. Capacitance 94 corresponds to R.F. bypass 74. In like manner, probe 64 is provided with a shorting bar 68 whose equivalent circuit comprises a variable inductance 95 in parallel with a variable capacitance 96 connected in series with capacitance 97 corresponding to the R.F. bypass 72. Rectified polarized electromagnetic wave energy is extracted by coaxial line 80 connected to terminals 98 and 99 and appears across load 100.

In operation, therefore, consider that a vertically polarized wave with respect to probe 64 of FIG. 8 has an instantaneous peak R.F. cycle whose negative vector is in in a direction in which rectification and current flow occurs in diode 78. Thus, current flows in the direction of output terminal 98. This current flow completes a path through diode 76 and shielded connecting cable 82 from output terminal 99. On the alternate R.F. half cycle the vertically polarized wave with respect to probe 64 has an instantaneous peak R.F. cycle whose negative vector is in a direction in which no rectification and no current flow occurs in diode 78. Thus, half-wave rectification of positive peaks of vertically polarized energy is achieved. This assumes that the arrow representation of the diodes in FIG. 8 designates the rectification for a positive cycle of energy as well as permitting conduction of direct current.

For rectification of a horizontally polarized wave assume that a horizontally polarized wave with respect to probe 66 has an instantaneous peak R.F. cycle whose positive vector is in a direction in which rectification and current flow occurs in diode 76. Thus, current flows from output terminal 99 through diode 76, through a shielded connecting cable 82, diode 78, and to terminal 98. On the alternate R.F. half cycle, assume that the horizontally polarized wave with respect to probe 66 has an instantaneous peak R.F. cycle whose negative vector is in a direction in which no rectification or current flow occurs in diode 76. Thus, half-wave rectification of positive peaks of horizontally polarized energy is achieved. Since an arbitrarily linearly polarized wave can be reduced to vertical and horizontal components of one of its field vectors, the magnitudes of these R.F. component signals after rectification are combined and summed to produce an output signal in load 100 having substantially the same magnitude for either a horizontal or vertically polarized signal or a signal having random orientation. For example, a 45 degree polarized wave provides instantaneous vertical and horizontal components which are combined to produce an output signal in load 100 of substantially the same magnitude as in the case of either a vertically or horizontally polarized signal. In this manner, polarization receiver 90 is capable of receiving, at the R.F. rate or transmission frequency, arbitrarily oriented linearly polarized energy.

In like manner, other polarizations including right and left hand circularly polarized waves and elliptically polarized electromagnetic waves become rectified and summed substantially independently of the orientation of the input electromagnetic energy. As noted, such energy may have a plurality of polarizations which are randomly or abitrarily oriented in time or space, or in time and space. Also, in the present illustration, the electric field vector rather than the magnetic field vector was utilized by the aforementioned intercept structure.

It is also understood that the multi-polarization receiver can be used as a multi-polarization signal mixer by injecting a second source of electromagnetic energy into the probe structure through the output line and extracting by well known techniques the sum and difference signals from the output line. Of course, it is equally understood that the multi-polarized input signal to said receiver can be modulated with well known types of modulation, such as amplitude modulation. In this case, rectification occurs to provide a reproduction of the input modulation which was applied to the input carrier signal. For example, a 1000 cycle modulation signal may be applied to the multi-polarized carrier signal having a frequency, for example, of 10 kilomegacycles, and an output signal which is a reproduction of the original modulation is provided.

It is apparent that one skilled in the art can make numerous additions to and modifications of the particular embodiments described without departing from the novel concepts disclosed herein. Consequently, the present invention is to be construed as limited only by scope of the appended claims.

What is claimed is:
1. In combination:
waveguide means including means for intercepting elec- tromagnetic energy having a plurality of polarizations;

means within said waveguide for rectifying orthogonal polarization components of said energy;

and means for simultaneously combining substantially all of said rectified components to provide an output signal independent of the orientation of said waveguide means with respect to said energy.

2. In combination:

guided wave means for propagating energy having a plurality of polarizations, unidirectional current means positioned in the path of said energy in said guide to rectify orthogonal components of said energy;

means for connecting unidirectional current means to combine substantially all the rectified components of said energy to provide an output signal independent of the orientation of said guided wave means with respect to said energy;

and means for extracting said output signal.

3. In combination:

means for detecting electromagnetic energy propagating along a guided wave structure and having a plurality of polarizations including unidirectional current means adapted to intercept and rectify the orthogonal components of said energy;

means for connecting said unidirectional current means in a manner to combine the rectified components of said polarized energy to provide a direct current signal independent of the orientation of said guided wave structure with respect to said energy;

and means for extracting said direct current signal from said unidirectional current means.

4. Means for receiving multi-polarized electromagnetic energy substantially independently of the orientation of said receiving means comprising interception means positioned in the path of orthogonal components of said polarized energy;

means for combining the components of energy intercepted comprising a plurality of unidirectional current devices connected in circuit with said interception means to rectify said orthogonal components of polarized energy;

and means for connecting said unidirectional current devices in series to sum the individual rectified components of said energy to provide an output signal independent of the polarization of said electromagnetic energy.

5. In combination:

guided wave means for propagating electromagnetic wave energy having a plurality of polarizations;

energy intercepting means positioned in the path of said energy within said guided wave means to rectify orthogonal components of said energy at the frequency of said energy;

means for connecting said energy intercepting means to sum the rectified components of said energy to provide an output signal;

and means for extracting said output signal.

6. In combination:

a propagating medium for electromagnetic wave energy having a multiplicity of polarizations;

means for directing said energy in a plane wave front, at least two interception means orthogonally positioned in the path of said energy within said propagating medium perpendicular to said plane wave front simultaneously to induce quadrature components of said energy in said intercepting means;

rectifying means connected to said intercepting means for simultaneously rectifying each component of said energy;

means connecting said rectifying means in a series loop circuit to sum said rectified components;

and means for extracting the summed output of said rectified components.

7. Means for receiving a multiplicity of polarizations of electromagnetic wave energy independently of the orientation of said receiving means with respect to the electric vector of said polarized energy comprising, means for directing said energy along a plane wave front;

at least two intercepting means positioned perpendicularly to the axis of said plane wave front comprising a first energy intercepting probe extending through said axis;

a second energy intercepting probe extending through said axis and orthogonal to said first probe;

at least two unidirectional current means connected to each end of said first and second probes and poled to rectify the quadrature components of energy intercepted thereby;

said unidirectional current means connected in series;

and means connected to each intercepting probe for extracting rectified energy at the input frequency.

8. In combination:

a propagating medium for electromagnetic wave energy having a multiplicity of polarizations;

means for directing said energy in a plane wave front, at least two interception means orthogonally positioned in the path of said energy perpendicular to said plane wave front simultaneously to induce quadrature components of said energy in said intercepting means;

rectifying means connected to said intercepting means for simultaneously rectifying each component of said energy;

means connecting said rectifying means in a series loop circuit to sum said rectified components;

means for extracting the summed output of said rectified components;

and means for adjusting the relative proportion of energy induced by said intercepting means.

9. A multi-polarization device comprising:

an electromagnetic wave propagating medium adapted to support a plurality of polarizations;

at least two energy intercepting and intersecting devices insulated with respect to each other and extending in the path of said energy and orthogonal to the direction of propagation of said energy through said medium, thereby to intercept quadrature components of said energy;

a rectifying device coupled to each intercepting device to rectify said quadrature components, said rectifying devices connected in a series circuit to sum substantially all rectified components of said polarized energy;

and an output circuit connected to said intercepting devices to extract rectified signals.

10. A multi-polarization receiving device comprising:

guided wave means for propagating energy having a plurality of polarizations;

at least two energy intercepting devices orthogonally positioned with respect to each other in said guided wave means and in the same plane perpendicular to the propagation of said energy;

at least one rectifying device coupled to each energy intercepting device to rectify quadrature components of polarized energy, said rectifying devices converted in a series circuit in a manner adapted to sum substantially all rectified components of said energy independently of the orientation of said energy intercepting devices in said perpendicular plane;

and output circuit means for extracting said summed components.

11. A multi-polarization device including at least two electromagnetic wave energy intercepting devices positioned to intercept orthogonal components of polarized electromagnetic wave energy in a propagating medium;

a rectifying device coupled to each energy intercepting device in a manner to sum substantially all components of polarized energy rectified thereby and independently of the orientation of said energy intercepting devices in a plane perpendicular to the direction of propagation of said wave energy;

and means for extracting said summed components.

12. In combination:

means for intercepting orthogonal components of an electromagnetic wave having a plurality of polarizations to induce in said intercepting means quadrature polarization components of said intercepted energy;

rectifying devices coupled to said intercepting means in a summing circuit;

and means for extracting rectified and summed polarization components.

13. A polarization system comprising:

a guided wave structure for propagating polarized electromagnetic wave energy having a multiplicity of polarizations;

at least two orthogonally extending intercept devices crossing each other at the axis of said guided wave structure to intercept quadrature components of said polarized energy;

at least a single unidirectional current device coupled to each said intercept devices and coupled in series to sum rectified components of polarized energy induced in said intercept devices;

and an output circuit connected to said intercept devices adjacent to the axis of said guided wave structure.

14. In combination:

means for intercepting propagating microwave energy having a plurality of polarizations;

means for simultaneously intercepting and rectifying quadrature components of said propagating microwave energy substantially independently of the orientation of the means for intercepting with respect to the plane wave front of said microwave energy;

and means for simultaneously combining substantially all rectified components of said energy to provide an output signal.

15. A device for rectifying orthogonal components of electromagnetic wave energy having a multiplicity of randomly oriented polarizations including means for instantaneously intercepting orthogonal components of said energy;

means for rectifying and simultaneously summing substantially all of said rectified components independently of the orientation of said device;

and output means coupled to said intercept means to provide a direct current output signal.

References Cited by the Examiner
UNITED STATES PATENTS

| 2,556,377 | 6/1951 | Robertson | 333—21 X |
| 3,034,118 | 5/1962 | Parisi | 343—100.3 |
| 3,093,825 | 6/1963 | Allen | 343—100.3 |
| 3,130,379 | 4/1964 | Hadley | 343—100.3 |
| 3,202,920 | 8/1965 | Riebman | 329—161 |

References Cited by the Applicant
UNITED STATES PATENTS

| Re. 21,818 | 6/1941 | Halstead. |
| 798,153 | 8/1905 | Artom. |
| 1,847,089 | 3/1932 | Heising et al. |
| 1,853,021 | 4/1932 | Alexanderson. |
| 1,965,184 | 7/1934 | Gothe. |
| 2,260,315 | 10/1941 | Halstead. |
| 2,613,349 | 10/1952 | Kandoian. |
| 2,982,959 | 5/1961 | Hanneken. |

CHESTER L. JUSTUS, *Primary Examiner.*

LEWIS H. MYERS, *Examiner.*

T. H. TUBBESING, H. C. WAMSLEY, *Assistant Examiners.*